April 30, 1935.  R. CAMMACK  1,999,625
WOODWORKING MACHINE
Filed May 8, 1934  2 Sheets-Sheet 1
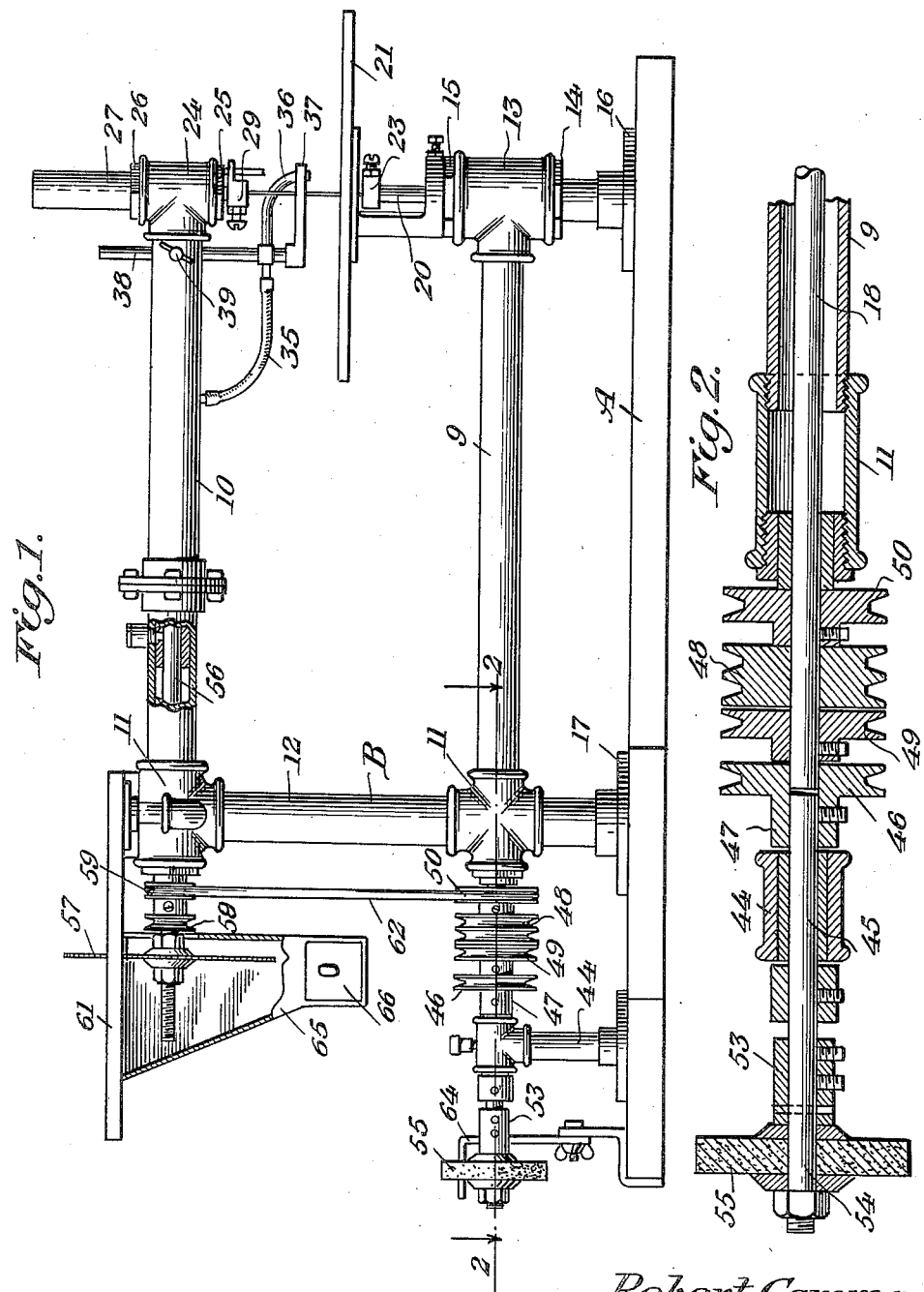
Robert Cammack
INVENTOR
BY Victor J. Evans & Co.
ATTORNEYS

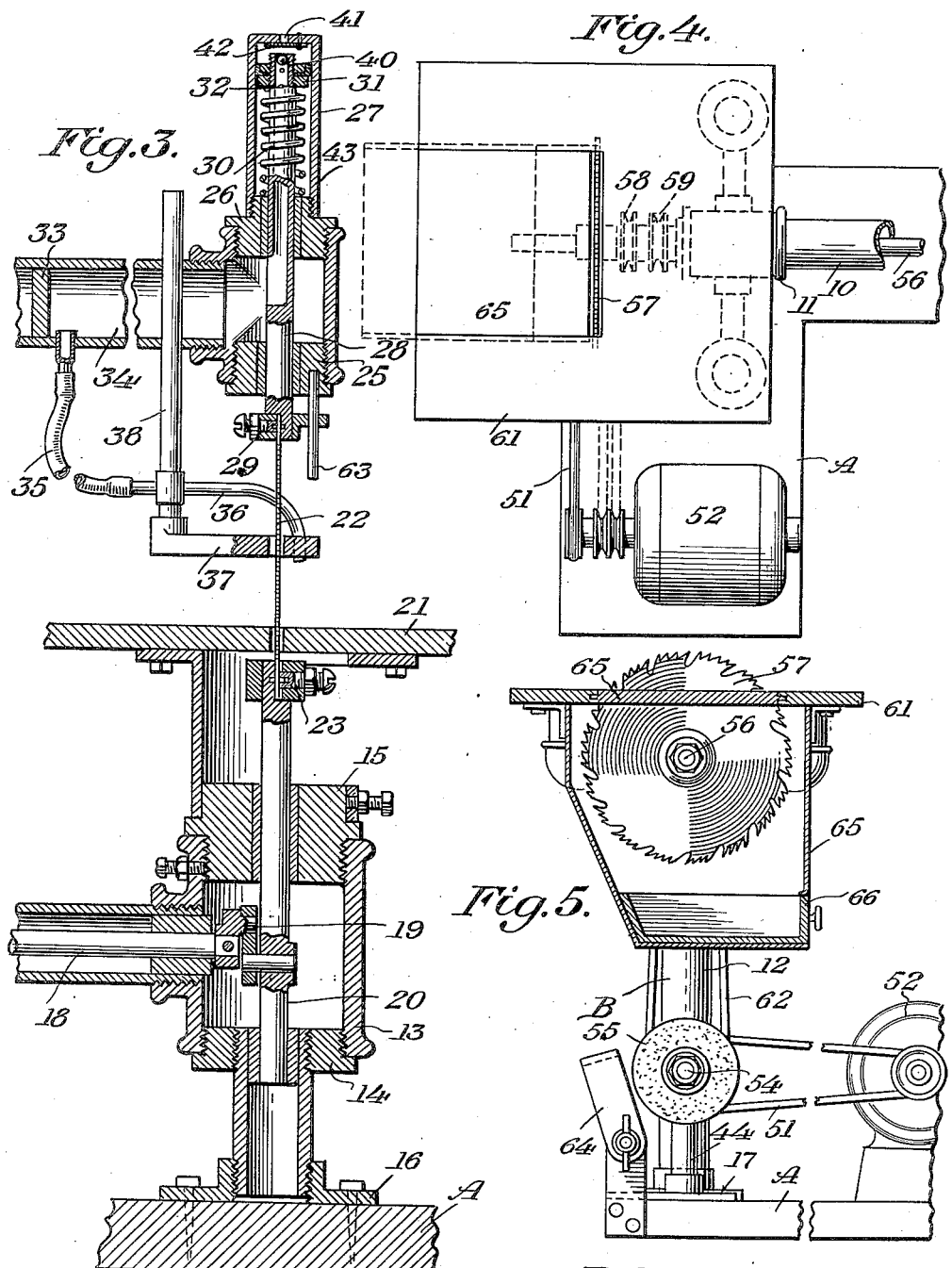

Patented Apr. 30, 1935

1,999,625

UNITED STATES PATENT OFFICE 1,999,625

WOODWORKING MACHINE

Robert Cammack, Gary, Ind.

Application May 8, 1934, Serial No. 724,563

1 Claim. (Cl. 143—70)

The invention relates to a woodworking machine.

The primary object of the invention is the provision of a machine of this character, wherein in its construction there is had handy for use a jig saw, a circular saw and detachable mountings for tools for use when woodworking, excepting lathe tools, the machine in its entirety being of novel construction and operable from a single power unit.

Another object of the invention is the provision of a machine of this character, wherein the woodworking tools, excepting the lathe tools, can be automatically operated and independently used at the selection of the operator of the machine and thus eliminate the requirement of separate machines for this purpose.

A further object of the invention is the provision of a machine of this character which is comparatively simple in construction, thoroughly reliable and efficient in its purposes, accurate in the working thereof, strong, durable, and inexpensive to manufacture.

With these and other objects in view, the invention consists in the features of construction, combination and arrangement of parts as will be hereinafter more fully described in detail, illustrated in the accompanying drawings, which disclose the prefered embodiment of the invention, and pointed out in the claim hereunto appended.

In the accompanying drawings:

Figure 1 is a side elevation of the machine constructed in accordance with the invention and a portion being broken away.

Figure 2 is a fragmentary vertical longitudinal sectional view showing the pulley arrangement and a grinder tool fitting.

Figure 3 is a fragmentary vertical sectional view through the machine at the jig saw end thereof.

Figure 4 is a fragmentary top plan view at the circular saw end of the machine.

Figure 5 is a fragmentary end elevation of the machine looking toward the circular saw end of the same.

Similar reference characters indicate corresponding parts throughout the several views in the drawings.

Referring to the drawings in detail, A designates a suitable bed or base for the machine which comprises a frame B including the lower and upper spaced parallel tubular bars 9 and 10, respectively, joined by pipe unions 11 with a tubular upright 12, the bars 9 and 10 being horizontally disposed and the upright 12 closing the frame at its end, while the other end of the frame is open. The bar 9, at the open end of the frame B, has fitted therewith a T union 13 constituting a vertically disposed housing having the end closures 14 and 15 detachably threaded in said union, the closure 14 being joined with a foot 16 suitably secured to the bed A and likewise the tubular upright 12, at its lower end, is provided with a foot 17 fixed to the bed A, so that in this manner the frame B is vertically and firmly supported.

Suitably journaled in the tubular bar 9 is a power shaft 18 which projects beyond the closed end of the frame B at one of its ends, while the other end of this shaft, through an eccentric 19, is connected with a stroke rod or stem 20 slidably fitted in the end closures 14 and 15 and working through the housing constituted by the union 13. Detachably fitted with the end closure 15 above the union 13 is a work support or table 21, through which plays a jig saw blade 22, the same being detachably secured at its lower end by a clamp 23 with the stroke rod or stem 20 for the reciprocation of said blade as operated from the power shaft 18.

The bar 10 of the frame A, at its open end, is fitted with a union 24 constituting a head having the end closures 25 and 26, respectively, the latter having detachably mounted thereon an air pump cylinder 27, while slidably fitted in the end closures 25 and 26 is a follower or tensioning rod or stem 28, the same having connection by a clamp 29 with the upper end of the jig saw blade 22. This rod 28 is held under tension by a coil spring 30 surrounding it and confined within the cylinder 27 so that the blade 22 will be held taut during reciprocation thereof in the working of the jig saw.

The rod 28 carries a piston 31 working in said cylinder 27 and also is formed with an air inlet passage 32 leading through the head union 24 into the bar 10, the latter carrying a partition 33 to provide an air chamber 34 common to the air passage 32 only.

Leading from the air chamber 34 is a hose 35 having connected therewith an air discharge nozzle 36 mounted in a work guide 37 to deliver air directly in the path of movement of the blade 22 for the blowing of sawdust and other accumulated matter away from said blade and from the work support or table 21. The work guide 37 has its hanger 38 adjustably mounted in the bar 10 and held by a set screw 39 in selected adjusted relation to the work support or table 21. The rod 28 has fitted at the upper end in the air passage 32 a ball check valve 40, while the cylinder 27 at its upper end is formed with an air inlet 41 controlled by a flap valve 42 and in one side of the cylinder is an air escape port 43, this being below the piston 31 so that on the downward movement of the piston air will be expelled from the cylinder 37 beneath said piston through the port 43 and air above the piston will be drawn into the cylinder 27 through the inlet 41 so that on the up stroke of the piston 31 the air within the cylinder 27 above the piston will be pumped into the chamber 34 and thence through the hose 35 and discharged through nozzle 36 for the purpose hereinbefore stated.

Upon the bed A, spaced a slight distance from the power shaft 18, is a bearing 44 having fitted therein a supplemental power shaft 45, the inner end of which has fixed thereto a pulley 46, its head 47 loosely receiving the end of the power shaft 18, which latter carries a double loose pulley 48 and the fixed pulleys 49 and 50, respectively, these being on opposite sides of the double loose pulley 48. Selectively engageable with the pulleys 46, 48 and 49 is an endless power belt 51 operated from a power unit 52, in this instance an electric motor supported upon the bed A.

Removably fitted upon the outer end of the supplemental power shaft 45 is a chuck 53 of any conventional type for the reception of woodworking tools, such as a boring tool, drill or other rotatable woodworking tool. This chuck 53, as shown in Figures 1 and 2, has engaged therein the axle 54 of a grinding wheel 55, this being an example of the mounting of a tool in the chuck.

Suitably journaled in the bar 10 to project beyond the closed end of the frame B is a driven shaft 56 having fitted on the projected end a circular saw 57 and also carrying the pair of fixed pulleys 58 and 59, respectively. The upper union 11 has formed therewith a bracket 60 for a work support or table 61 common to the circular saw 57.

Engageable with either of the pulleys 58 and 59 is an endless power belt 62, the same being shiftable to either the double pulley 48 or the fixed pulley 50 upon the power shaft 18, the pulleys 58 and 59 being vertically aligned with the said double pulley 48 and the fixed pulley 50.

When it is desired to operate only the jig saw blade 22, power is transmitted from the unit 52 through pulley 49, driving power shaft 18, thus operating the blade 22, it being understood, of course, that the belt 62, in this instance, will have been shifted to pulley 59 and loose pulley 48. Should it be desired to operate the grinder wheel 55 only, the power belt 51 is shifted from pulley 49 onto pulley 46, thereby driving said grinding wheel, with the other parts of the machine inactive.

For operation of the circular saw 57, the belt 62 being engaged with the pulley 48 and pulley 58, it is only necessary to shift the power belt 51 from pulley 46 onto pulley 48 so that power will be transmitted directly to the said circular saw.

Engaged in the end closure 25 is a guide 63 which operates the clamp 29 so as to obviate any twisting of the jig saw blade 22 on the reciprocation thereof.

Carried by the bed A next to the grinding wheel 55 is an adjustable work holder 64, the purpose thereof being obvious.

The saw table 61 carries an adjustable section 65 so that the proper opening can be had in the table, particularly when the shaft 56 is substituted for the circular saw 57, or a planer head or the like is substituted.

Beneath the saw table 61 and fixed thereto in any suitable manner is a sawdust trap or receiver 65, this having at its bottom a sliding drawer or tray 66, and the purpose of said trap or receiver is to catch the sawdust during the operation of the saw 57, the said trap or receiver enveloping that portion of the saw operating beneath the said table 61 in the working of the machine.

What is claimed is:

A machine of the character described comprising a frame having a tubular bar, a hollow T-shape head open at its top, bottom and one side, the bar being connected with the head for communication therewith through the open side, releasable caps closing the top and bottom of said head, a pump cylinder carried by the top cap, a pump piston operating in the cylinder and having its stem working through said caps, the stem being provided with an airway establishing communication between the cylinder beyond the piston and the head for directing air under pressure to the tubular bar, a coiled spring active upon the piston to urge the same in one direction, a partition in the bar to provide an air chamber therein common to said head, a tool clamp on the stem, an air dispenser leading from the air chamber to a tool carried by said clamp, and means for actuating the tool and the said piston.

ROBERT CAMMACK.